Sept. 12, 1944.  H. L. LINDBLAD  2,358,238
FILTER FOR DRY CLEANING LIQUIDS
Filed Feb. 24, 1941
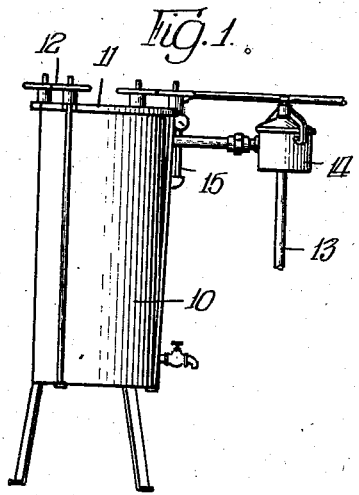
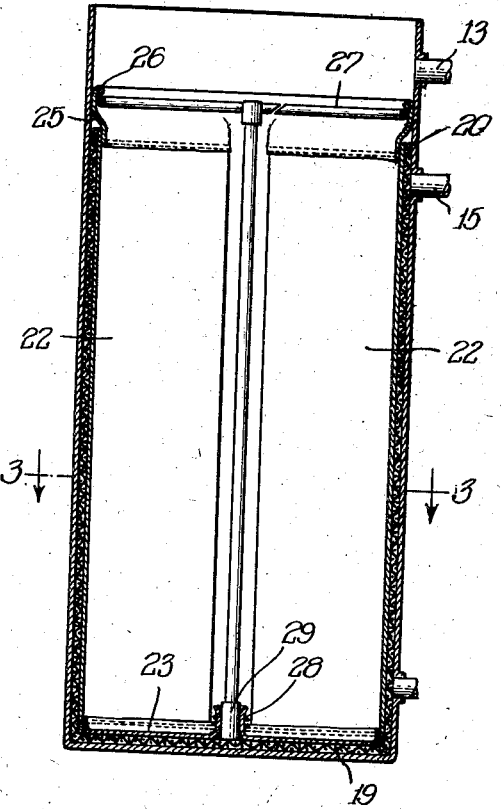
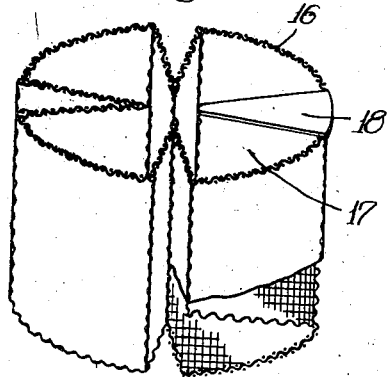
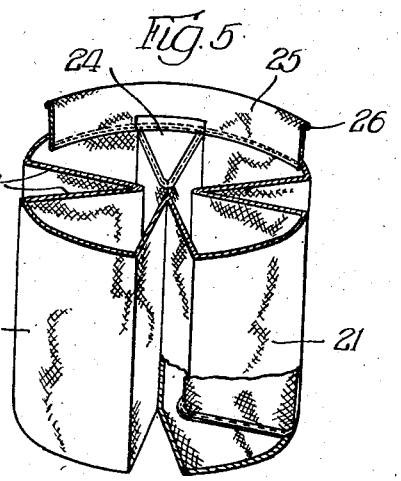
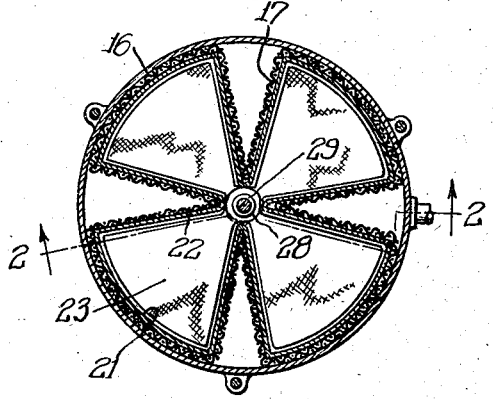
INVENTOR.
Harald L. Lindblad,
BY
Atty.

Patented Sept. 12, 1944

2,358,238

UNITED STATES PATENT OFFICE 2,358,238

FILTER FOR DRY CLEANING LIQUIDS

Harald L. Lindblad, Chicago, Ill., assignor to Mercury Cleaning Systems, Chicago, Ill., a corporation of Illinois Application February 24, 1941, Serial No. 380,135

10 Claims. (Cl. 210—169)

My invention relates to filtering devices and particularly to a filter adapted for use in treating dry cleaning liquids.

One object of my invention is to provide a filter of relatively great capacity, although of small outside dimensions. This result is accomplished by so arranging the support and the filter cloth that the effective area of the filter cloth is very greatly increased. This area is increased in a cylindrical structure by providing a plurality of folds extending inwardly. Thus the extent of the increased area may be governed by the number of folds provided in the cloth. As a matter of convenience and facility in operation, I provide a reticulated support, shaped to conform to the shape of the filter bag whereby the filter cloth is caused to lie snugly against the support throughout its area.

Another object of my invention is to provide for the injection of the earthy powder used in filters of this type directly into the filter, a quantity being taken up by the flow of liquid from the washer into the filter. Thus the powder which is carried in suspension in the liquid cannot reach the clothing being cleaned, since it is filtered out by the filter cloth in the filter.

Another object is to provide both the inlet and outlet for the filter at the top of the filter tank or container, the inlet being, of course, to the inside of the filter bag and the outlet at the outside of the bag. By this arrangement I have found that there is better circulation and dispersion of the solids within the body of liquid.

The invention will be more readily understood by reference to the accompanying drawing, in which, Fig. 1 is an elevation of a filtering device constructed in accordance with my invention;

Fig. 2 is a transverse vertical sectional view on the irregular line 2—2 of Fig. 3;

Fig. 3 is a sectional view on the line 3—3 of Fig. 2; and,

Figs. 4 and 5 are perspective views of the screen and bag, respectively, at the top ends thereof.

In the drawing I have illustrated a tank 10 suitably supported on legs and having a cover plate 11 closed by the hand screws 12. Liquid is delivered from the washer through a pipe 13 open to the upper end of the tank and in this pipe I interpose a container 14 acting as an injector for the powdered earth used in the treatment of the liquid. A quantity of the powder is placed in the container and is taken up by the flow of liquid therethrough.

The tank also provides an outlet pipe 15, also located at the top of the tank, since this location appears to bring about a better circulation and dispersion of the powder throughout the body of liquid.

The internal arrangement of the filter includes a reticulated support preferably composed of large-mesh screening, the support being of generally cylindrical form and conforming to the interior dimensions of the tank 10. This support is composed of arcuate sections 16 and radially V-shaped folded sections 17. The otherwise open tops of the V-shaped sections are closed by wedge-shaped pieces 18 that may be welded or otherwise secured in place. These pieces may be solid or reticulated, as desired. At the bottom the spaces between the V-shaped sections are closed by wedge shaped sections 19 of reticulated material, thus elevating the support above the bottom wall of the tank to enable the passage of liquid across the bottom. The support is thus a unitary rigid structure that may be handled, placed in and removed from the tank without difficulty. At the upper end, a split ring 20 of square cross-section is used to hold the support in its seated position.

The textile material acting as the filter element is composed of filter cloth and formed as a bag. This structure, as best shown in Fig. 5, is likewise composed of arcuate side walls 21 having inwardly extending folds 22 shaped to conform to and lie inside of the V-shaped portions of the support, as best shown in Fig. 3. At the bottom, the space between adjacent folds is closed by sections 23 and at the top the spaces over the folds are closed by sections 24. The sections 23 and 24 are both preferably composed of the same material as that composing the filter bag. These sections 24 overlie the wedge shaped pieces 18. At the top the bag is provided with a continuous strip 25 having a bead 26, used for effecting a seal between the bag and the inside wall of the tank, as best shown in Fig. 2. A round, split ring 27 is employed as the clamping element.

It will be understood that while in Figs. 4 and 5 I have shown sections 18 and 24, and 19 and 23, in only one instance they will occur at the top and bottom of each of the folds.

On the bottom wall of the bag at the center thereof I provide a sleeve 28 adapted to be clamped around the lower end 29 of a rod or pipe which extends upwardly at the axis of the tank and is centered and held in substantially centered position by the inwardly projecting folds of the support and fabric. The use of this device acts to insure the centering of and proper location of the filter bag at the bottom.

The structure as described will be found to be highly efficient in operation, the filter bag may be quickly removed and replaced as required and the largely increased area will result in highly efficient operation of the unit.

While I have shown the support and bag as constructed with four radial folds in the material, it will be understood that my invention contemplates the use of a greater or less number of folds as desired. It will be understood also that the particular means shown for elevating the structure above the bottom wall of the tank may be replaced by other and different structures. These and other modifications should be considered to be within the scope of the appended claims.

I claim:

1. In a filter for liquids, the combination of a tank, a reticulated support within said tank for a filter cloth bag, said support being of generally cylindrical form having a plurality of inwardly projecting folds and having means at the bottom for permitting passage of liquid across the bottom, a filter cloth bag on said support having sections closing the bag between adjacent folds at the bottom and sections overlying the folds at the top, and means providing an inlet into the space within the filter bag and an outlet from the space in the tank outside of said bag.

2. In a filter for liquids, the combination of a tank, a reticulated support within said tank for a filter cloth bag, said support being of generally cylindrical form having a plurality of inwardly projecting folds and having means at the bottom for permitting passage of liquid across the bottom, means for connecting the folds across their tops, a filter cloth bag on said support having sections closing the bag between adjacent folds at the bottom and sections overlying the folds at the top, and means providing an inlet into the space within the filter bag and an outlet from the space in the tank outside of said bag.

3. In a filter for liquids, the combination of a tank, a reticulated support within said tank for a filter cloth bag, said support being of generally cylindrical form having a plurality of inwardly projecting folds and having means at the bottom for permitting passage of liquid across the bottom, a filter cloth bag on said support having sections closing the bag between adjacent folds at the bottom and sections overlying the folds at the top, expansible means for clamping the bag against the inside wall of the tank at the top, and means providing an inlet into the space within the filter bag and an outlet from the space in the tank outside of said bag.

4. In a filter for liquids, the combination of a tank, a reticulated support within said tank for a filter cloth bag, said support being of generally cylindrical form and having a plurality of inwardly projecting folds, means for connecting the folds across their tops, a filter cloth bag on said support having sections closing the bag between adjacent folds at the bottom and sections overlying the folds at the top, expansible means for clamping the bag against the inside wall of the tank at the top, and means providing an inlet into the space within the filter bag and an outlet from the space in the tank outside of said bag.

5. A filter cloth bag, comprising a body of cloth of generally cylindrical form having a plurality of radially inwardly positioned folds, and means imperforate to solids closing the spaces at the bottom between adjacent folds and overlying and closing the top openings in the folds.

6. A filter cloth bag adapted for use in a cylindrical tank, comprising a body of cloth of generally cylindrical form having a plurality of radially inwardly positioned folds, means imperforate to solids closing the spaces at the bottom between adjacent folds and overlying and closing the top openings in the folds, and a continuous vertical band or strip connected to the top of the bag and adapted to be clamped against the wall of the tank.

7. In a filter for liquids, the combination of a tank, a reticulated support within said tank for a filter cloth bag, said support being shaped to provide a plurality of radially arranged V-shaped folds between arcuate wall sections, a filter cloth bag on said support shaped to fit against the inside walls of the support and arranged to filter the liquid flow through the tank, said bag having a central sleeve at its bottom, a rod extending substantially axially of the tank having its lower end secured in said sleeve, and means providing an inlet into the space within the filter bag and an outlet from the space in the tank outside of said bag.

8. In a filter for liquids, the combination of a tank, a reticulated support within said tank for a filter cloth bag, said support being shaped to provide a plurality of radially arranged V-shaped folds between arcuate wall sections, a filter cloth bag on said support shaped to fit against the inside walls of the support and arranged to filter the liquid flow through the tank, said bag having a central sleeve at its bottom, a rod extending substantially axially of the tank having its lower end secured in said sleeve, said rod being held in position substantially at the axis of the tank by the inwardly projecting V-shaped folds of the support and bag, and means providing an inlet into the space within the filter bag and an outlet from the space in the tank outside of said bag.

9. In a filter for liquids, the combination of a tank, a reticulated support within the tank for a filter cloth bag, said support being of generally cylindrical form and having a plurality of inwardly projecting folds, a filter cloth bag on said support, means imperforate to solids closing the spaces between adjacent folds at the bottom of the bag and closing the folds at the top of the bag, and conduits for liquid communicating with the space within the filter bag and with the space in the tank outside of said bag.

10. In a filter for cleaning solvents, the combination of a cylindrical, vertical tank, a reticulated support in the form of a rigid unitary structure of generally cylindrical form and having radial folds, a filter bag overlying said support and conforming to the folds thereof and arranged to filter liquid within the tank, and an upstanding rod secured to the bottom wall of the bag and centered substantially axially of the tank by means of the radial folds of the support and bag and serving to fix the position of the bottom wall of the bag, said tank having a liquid inlet to the space within the bag and an outlet from the space outside of the bag.

HARALD L. LINDBLAD.